(12) United States Patent
Pialot

(10) Patent No.: US 9,688,106 B2
(45) Date of Patent: Jun. 27, 2017

(54) NOISE-REDUCING DEVICE INTENDED TO BE INSERTED INTO A GROOVE IN THE TREAD OF A TIRE AND TIRE COMPRISING A DEVICE OF THIS TYPE

(75) Inventor: Frédéric Pialot, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 192 days.

(21) Appl. No.: 13/991,376

(22) PCT Filed: Nov. 22, 2011

(86) PCT No.: PCT/EP2011/070621
§ 371 (c)(1),
(2), (4) Date: Jul. 26, 2013

(87) PCT Pub. No.: WO2012/072444
PCT Pub. Date: Jun. 7, 2012

(65) Prior Publication Data
US 2013/0292020 A1    Nov. 7, 2013

(30) Foreign Application Priority Data

Dec. 2, 2010    (FR) ..................... 10 60018

(51) Int. Cl.
*B60C 11/00*    (2006.01)
*B60C 11/03*    (2006.01)
(Continued)

(52) U.S. Cl.
CPC .......... *B60C 11/13* (2013.01); *B60C 11/0309* (2013.04); *B60C 11/18* (2013.01);
(Continued)

(58) Field of Classification Search
CPC ... B60C 1/0016; B60C 11/00; B60C 11/0008; B60C 11/13; B60C 11/1307;
(Continued)

(56) References Cited

U.S. PATENT DOCUMENTS 3,768,535 A * 10/1973 Holden ............... B60C 11/0309
152/209.24
3,769,843 A * 11/1973 Sperberg .................. G01N 3/56
73/146

(Continued)

FOREIGN PATENT DOCUMENTS

DE    4403662 A1    8/1995
EP    1358079 A1    6/1996
(Continued)

OTHER PUBLICATIONS

Machine translation of JP 2003-335109, 2003.*
(Continued)

*Primary Examiner* — Justin Fischer
(74) *Attorney, Agent, or Firm* — Dickinson Wright PLLC

(57) ABSTRACT

Noise-reducing device intended to be added to a groove of the tread of a tire comprising an elastic sole preferably extending in a given longitudinal direction, wherein the said sole on one of its faces comprises one or several flexible walls the planes of which run substantially perpendicular to the longitudinal direction of the sole.

14 Claims, 2 Drawing Sheets

(51) Int. Cl.
*B60C 11/14* (2006.01)
*B60C 11/18* (2006.01)
*B60C 11/13* (2006.01)
*B60C 19/00* (2006.01)
*B60C 11/16* (2006.01)

(52) U.S. Cl.
CPC ............ *B60C 19/002* (2013.04); *B60C 11/14* (2013.01); *B60C 11/1637* (2013.04)

(58) Field of Classification Search
CPC ..... B60C 11/14; B60C 11/16; B60C 11/1625; B60C 11/1637; B60C 11/1643; B60C 11/18
See application file for complete search history.

(56) References Cited

U.S. PATENT DOCUMENTS

| | | | | |
|---|---|---|---|---|
| 3,770,040 | A * | 11/1973 | De Cicco | B60C 11/24 116/208 |
| 5,576,373 | A * | 11/1996 | Kresge | B60C 1/0008 524/445 |
| 6,119,744 | A | 9/2000 | Tsukagoshi | |
| 6,592,704 | B1 * | 7/2003 | Benzing, II | B26D 3/003 156/264 |
| 2004/0016491 | A1 | 1/2004 | Martin et al. | |
| 2011/0259493 | A1 | 10/2011 | Dautrey | |

FOREIGN PATENT DOCUMENTS

| | | | |
|---|---|---|---|
| EP | 0 908 330 | A1 | 4/1999 |
| EP | 1110763 | * | 6/2001 |
| FR | 2 715 891 | A1 | 8/1995 |
| GB | 2 450 723 | | 1/2009 |
| JP | 4-221207 | A | 8/1992 |
| JP | 8-150812 | A | 6/1996 |
| JP | 2003335109 | | 11/2003 |
| JP | 4872273 | B2 | 2/2012 |
| WO | WO 02/060705 | A1 | 8/2002 |
| WO | WO 2010/063749 | A1 | 6/2010 |

OTHER PUBLICATIONS

Chinese Office action for Application No. 201180057891.9 dated Jan. 7, 2015.
International Search Report (PCT/ISA/210) issued on Dec. 12, 2011, by the European Patent Office as the International Searching Authority for International Application No. PCT/EP2011/070621.

* cited by examiner

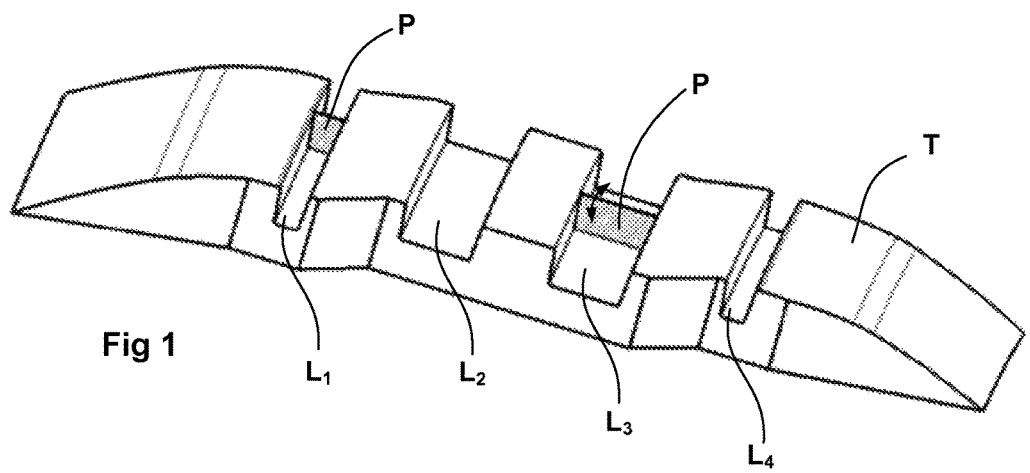
Fig 1
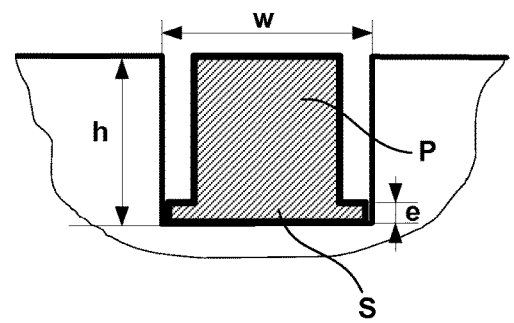
Fig 2
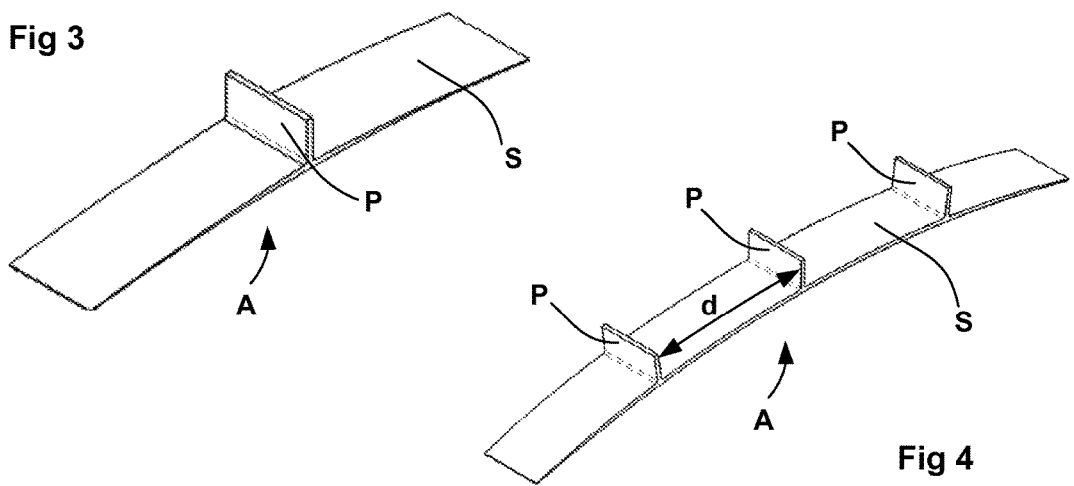
Fig 3
Fig 4

NOISE-REDUCING DEVICE INTENDED TO BE INSERTED INTO A GROOVE IN THE TREAD OF A TIRE AND TIRE COMPRISING A DEVICE OF THIS TYPE

BACKGROUND

1. Field

The invention relates to the field of manufacture of tires, comprising flexible walls arranged in a groove of the tire tread pattern.

2. Description of Related Art

The purpose of the grooves in the tread pattern is to drain away and remove water when the tire is running on wet or soaking wet ground. These grooves are the cause of some of the running noise phenomena in that they constitute regions in which air under pressure accumulates, generating sound waves. The grooves run in the circumferential direction and in the axial direction and their layout, dimensions and the number of them are the subject of detailed study on the part of tire tread pattern designers.

With a view to reducing the level of tire running noise, while at the same time preserving the water clearance qualities, it is known practice in the prior art to position flexible walls of small thickness in a direction transverse to the direction of the grooves. These mobile walls, also known as flaps, have the special feature, like a door, of extending transversely from one of the walls of the groove and of remaining in the closed position when the tire is running on dry ground, so as to block the spread of the sound waves, and of being able to open when the tire is running on wet ground in order to allow the water that enters the drainage groove to be cleared.

Publications FR 2 715 891, GB 2 450 723 or even EP 908 330 describe varying embodiments of these noise-reducing devices.

The noise-reducing devices described in these publications are connected to one of the walls of the groove, and this connection forms a kind of articulation about which the mobile wall of the noise-reducing device, on account of its flexibility, passes successively from the open position into the closed position under the action of the pressure from the water or from the air.

The flexible wall or door may itself have one or more radial cuts. The thickness of the flexible walls varies between 0.2 mm and 1 mm. The width of the cuts can be adjusted at will according to the particular shape that it is wished that the lateral edges of the door of the noise-reducing device should have.

In practice, the moulds intended for moulding the tires comprising these contrivances comprise substantially radial cuts made in the ribs intended to mould the draining grooves, which run transversely to the direction of the said ribs.

However, there are a great many difficulties associated with creating these cuts with the required level of accuracy because of the need to control undercuts. In addition, when a high number of tires is going to be moulded using a mould comprising the said cuts, it is found that the cuts become soiled or even plugged, this being detrimental to the quality of the tire obtained, and dictating the need for extensive and costly maintenance.

SUMMARY

It is an object of the invention to provide a simple solution that allows the abovementioned problems to be overcome.

One subject of the invention is a noise-reducing device intended to be added to a groove of the tread of a tire comprising an elastic sole preferably extending in a given longitudinal direction. According to the invention, the said sole on one of its faces comprises one or several flexible walls the planes of which run substantially perpendicular to the longitudinal direction of the sole.

The invention also relates to a tire comprising one or several grooves of given depth and width, in which at least one groove comprises at least one noise-reducing device as proposed in the preceding paragraph.

In that way, noise-reducing devices can be installed simply by adding them to the groove of a vulcanized tire. The invention thus makes it possible to avoid the abovementioned disadvantages associated with moulding, and to fit the tires with a noise-reducing device to order, without there being any need to modify the existing moulds, and very much further downstream in the distribution circuits.

Advantageously, the flexible walls have a thickness of between 0.5 mm and 2 mm.

According to customary practice, the material used to make the said device may be a rubber-containing elastomer or even a thermoplastic elastomer.

It may also prove advantageous to plan for the walls and the sole to be made from one and the same material.

With preference, the flexible walls are spaced apart in the longitudinal direction of the sole by a length of between 10 mm and 50 mm.

In order to improve the bonding of the sole into the bottom of the groove, the two longitudinal ends of the said sole may advantageously taper in the thickness direction.

One alternative form of embodiment could be for the two longitudinal ends to be butted together so that the said sole forms a continuous elastic ring in which the flexible walls are situated radially on the outside of the said ring.

It will also be contrived for the flexible walls increased by the height of the elastic sole to have a height less than or equal to the depth of the groove, and for the elastic sole and the flexible walls to have a width less than or equal to the width of the groove of the tire.

Advantageously, the said sole is bonded to the radially internal wall of the groove.

When the tire comprises a noise-reducing device of the type corresponding to a ring, care will be taken to ensure that the circumference of the sole is less than the circumference of the bottom of the groove of the tire.

BRIEF DESCRIPTION OF DRAWINGS

The description which follows is supported by FIGS. 1 to 7 in which:

FIG. 1 depicts a partial schematic view of a tire comprising flexible walls arranged in the circumferential grooves, FIG. 2 illustrates in a view in section of a noise-reducing device according to the invention, FIGS. 3 and 4 illustrate perspective views of noise-reducing devices according to the invention.

DETAILED DESCRIPTION OF SPECIFIC EMBODIMENTS

Figure 5:
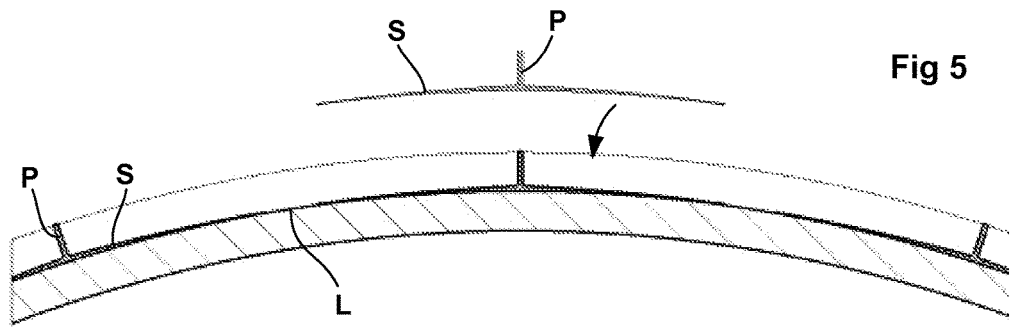
FIG. 5 illustrates one example of the positioning of a noise-reducing device according to the invention, by bonding it into the bottom of a groove of a tire.

The portion of tire T depicted in FIG. 1 comprises a plurality of grooves $L_1$, $L_2$, $L_3$ and $L_4$ running in the circumferential direction of the tread. By way of example, two of these grooves $L_1$ and $L_3$, are equipped with flexible walls P. These walls are securely articulated to the bottom wall of the groove and are alternately angled about this connection in the directions indicated by the double-headed arrow drawn over the top of the flexible wall P of the groove $L_3$.

FIGS. 3 and 4 illustrate one first embodiment of noise-reducing devices according to the invention, and which comprises a sole S comprising one or more flexible walls P the planes of which are positioned substantially perpendicular to the longitudinal direction of the said sole S.

The two longitudinal ends of the sole S taper in the thickness direction. This contrivance improves the retention of the sole when the noise-reducing device is bonded into the bottom of a groove L.

FIG. 2 depicts, in a view in section, a noise-reducing device according to the invention, arranged in a groove of depth h and of width w. It is then contrived for the width of the sole S and the width of the wall P to be less than or equal to the width w of the groove, and for the height of the wall P, increased by the thickness e of the sole to be less than or equal to the depth h of the groove.

The noise-reducing device may be made from a rubber-based or a thermoplastic-based elastomeric material. The material chosen for making the flexible wall will preferably be a material that has the best properties of flexing, in particular a material the elastic modulus of which allows opening under the action of the pressure of the water and closing when only the pressure of the air is acting on the two faces at the usual running speeds of the vehicle intended to be fitted with the tire equipped with the noise-reducing device thus defined. This parameter may also be adjusted by altering the thickness of the flexible wall, which is advantageously between 0.5 mm and 2 mm.

Likewise, the material of the sole will have the elastic properties that allow it to accompany the movements of the tread while at the same time displaying good compatibility with the bonding means employed to cause the underside face of the sole of the noise-reducing device to adhere to the material of which the tread is made.

For practical reasons associated with the production thereof, and although it is entirely possible to produce noise-reducing devices using different composite materials for the flexible wall and for the sole, these devices will be made of one and the same material, adjusting the dimensional parameters of the flexible wall in order to suit the desired flexural functionalities.

The spacing between two successive flexible walls is also determined by the characteristics of the vehicle on which a tire fitted with devices according to the invention is to be mounted and for which as a general rule it is desirable for several devices to be simultaneously present in the contact patch. For the most commonplace use, this distance is between 10 mm and 50 mm.

The choice of bonding means will be adapted to suit the nature of the materials of which the tread and the sole of the noise-reducing device are made. In particular, care will be taken to ensure that the quality of the bond is compatible with the centrifugal forces generated by high-speed running.

The material of which the sole is made can be made using any type of elastomeric material, provided that the bonding system is suited to bonding the sole to the material used for the tread of the tire.

By way of example, for a tread made of a diene elastomer or of a thermoplastic elastomer, a sole may be chosen that is made from a diene elastomer of the same type or from a material of the thermoplastic elastomer, polyurethane type, a silicone-based material, or even a material formed of an elastomer of the butyl type or EPDM. In these various instances the adhesive used will, depending on the pairs of materials chosen, be an adhesive of the polyurethane-urea type with a surface activator or a poly-urea adhesive with a surface primer. Bonding may be performed in the hot state or at a temperature slightly higher than ambient temperature.

It will be noted at this stage that, when the noise-reducing device is bonded into the bottom of the groove of the tread of a tire, it is of low importance whether this groove is oriented in an essentially circumferential or axial direction. All that is important is that its length be greater than or equal to the length of the sole.

Figure 6:
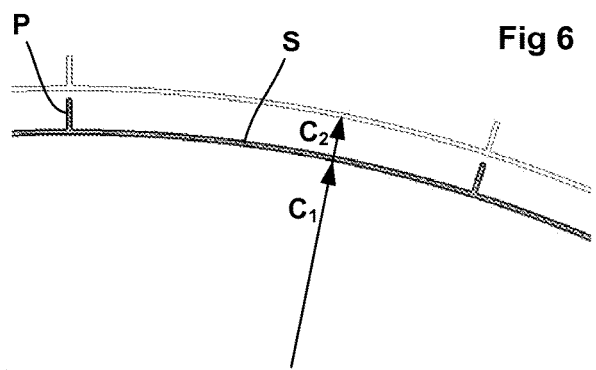
FIGS. 6 and 7 illustrate the positioning of noise-reducing devices according to one particular embodiment of the invention in a groove of a tire.
Figure 7:
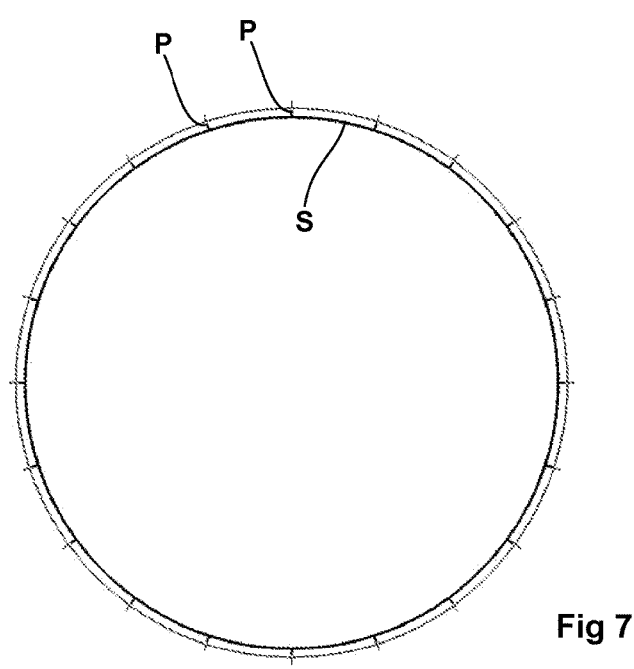

FIGS. 6 and 7 illustrate an alternative form of embodiment which proves to be particularly advantageous when it is desirable to equip tires the tread of which has grooves running essentially in the circumferential direction.

According to this embodiment, the two longitudinal ends of the sole are joined to form a ring. The flexible walls are positioned radially towards the outside of the ring. All that is required therefore is the choice of a continuous elastic ring the free circumference of which is slightly smaller than the circumference of the bottom of the groove of the tire into which this noise-reducing device is to be positioned so that the elastic sole is under tension when the ring is placed in the bottom of the groove of the tread. This tension provides the grip needed to keep the noise-reducing device in the groove of the tread during running.

There is then no longer any need for the sole to be bonded to the bottom of the groove, although such bonding is still recommended.

The invention claimed is:

1. A noise-reducing device in a groove of a tread of a tire, the device comprising
   an elastic sole extending in a longitudinal direction, the sole being substantially flat and disposed in a substantially flat bottom wall of the groove,
   one or more grooves of depth (h) and of width (w),
   wherein the sole comprises a face having one or more flexible walls extending therefrom,
   each flexible wall having a plane that extends substantially perpendicular to the longitudinal direction of the sole, and
   wherein a plurality of the flexible walls are spaced apart in the longitudinal direction by a length of between 10 mm and 50 mm, and
   at least one groove comprises at least one noise-reducing device, and
   the noise-reducing device is bonded to the radially internal wall of the groove of the tire, by only the elastic sole,
   the sole comprises two longitudinal ends that taper in the thickness direction, wherein the circumference of the sole is less than the circumference of the bottom of the groove of the tire.

2. The noise-reducing device according to claim 1, wherein the flexible walls have a thickness of between 0.5 mm and 2 mm.

3. The noise-reducing device according to claim 1, wherein the material used to make the said device is a rubber-containing elastomer.

4. The noise-reducing device according to claim 3, wherein the walls and the sole are made from the same material.

5. The tire according to claim 1, wherein the flexible walls of the noise-reducing device increased by the thickness (e) of the sole have a height less than or equal to the depth (h) of the groove.

6. The tire according to claim 1, wherein the flexible walls and the sole of the noise-reducing device have a width less than or equal to the width (w) of the groove.

7. The noise-reducing device according to claim 1, wherein the sole comprises a second face, opposing the face from which the walls extend, adapted to contact one or more internal surfaces of a groove of a tire.

8. The noise-reducing device according to claim 1, wherein the longitudinal direction of the sole is substantially parallel to the circumferential direction of a groove of a tire.

9. The tire according to claim 1, wherein the longitudinal direction of the sole is substantially parallel to the circumferential direction of a groove of the tire.

10. The tire according to claim 1, wherein the longitudinal edges taper to a maximum thickness at a point where the at least one of the flexible walls extends therefrom.

11. A noise-reducing device in a groove of a tread of a tire, the device comprising
an elastic sole extending in a longitudinal direction, the sole being substantially flat and disposed in a substantially flat bottom wall of the groove,
wherein the sole comprises a face having one or more flexible walls extending therefrom,
each flexible wall having a plane that extends substantially perpendicular to the longitudinal direction of the sole, and
wherein the material used to make the device is a thermoplastic elastomer, and
at least one groove comprises at least one noise-reducing device, and
the noise-reducing device is bonded to the radially internal wall of the groove of the tire, by only the elastic sole,
the sole comprises two longitudinal ends that taper in the thickness direction, wherein the circumference of the sole is less than the circumference of the bottom of the groove of the tire.

12. The noise-reducing device according to claim 11, wherein the walls and the sole are made from the same material.

13. A noise-reducing device in a groove of a tread of a tire, the device comprising
an elastic sole extending in a longitudinal direction, the sole being substantially flat and disposed in a substantially flat bottom wall of the groove,
wherein the sole comprises a face having one or more flexible walls extending therefrom,
each flexible wall having a plane that extends substantially perpendicular to the longitudinal direction of the sole, and
wherein the sole comprises two longitudinal ends that taper in the thickness direction, and
at least one groove comprises at least one noise-reducing device, and
the noise-reducing device is bonded to the radially internal wall of the groove of the tire, by only the elastic sole,
the sole comprises two longitudinal ends that taper in the thickness direction, wherein the circumference of the sole is less than the circumference of the bottom of the groove of the tire.

14. A noise-reducing device in a groove of a tread of a tire, the device comprising
an elastic sole extending in a longitudinal direction, the sole being substantially flat and disposed in a substantially flat bottom wall of the groove,
wherein the sole comprises a face having one or more flexible walls extending therefrom,
each flexible wall having a plane that extends substantially perpendicular to the longitudinal direction of the sole, and
wherein the sole comprises two longitudinal ends of the sole that butt together so that the sole forms a continuous elastic ring in which the flexible walls are situated radially on the outside of the ring, and
at least one groove comprises at least one noise-reducing device, and
the noise-reducing device is bonded to the radially internal wall of the groove of the tire, by only the elastic sole,
the sole comprises two longitudinal ends that taper in the thickness direction, wherein the circumference of the sole is less than the circumference of the bottom of the groove of the tire.

* * * * *